US009325566B2

(12) United States Patent
Patil et al.

(10) Patent No.: US 9,325,566 B2
(45) Date of Patent: Apr. 26, 2016

(54) SEAMLESS WI-FI SUBSCRIPTION REMEDIATION

(75) Inventors: Basavaraj Patil, Coppell, TX (US); Gabor Bajko, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/372,015

(22) Filed: Feb. 13, 2012

(65) Prior Publication Data

US 2012/0210404 A1   Aug. 16, 2012

Related U.S. Application Data

(60) Provisional application No. 61/442,440, filed on Feb. 14, 2011.

(51) Int. Cl.
G06F 21/00 (2013.01)
H04L 12/24 (2006.01)
H04L 29/08 (2006.01)
G06F 21/33 (2013.01)

(52) U.S. Cl.
CPC ............ *H04L 41/0293* (2013.01); *G06F 21/33* (2013.01); *H04L 67/02* (2013.01)

(58) Field of Classification Search
USPC ................... 713/175, 156; 726/14; 725/5, 30; 705/76–79
See application file for complete search history.

(56) References Cited

U.S. PATENT DOCUMENTS 7,284,062 B2 * 10/2007 Krantz .................... H04L 63/08 709/229
7,565,688 B2 * 7/2009 Hall ...................... H04L 63/102 713/168
7,810,137 B1 * 10/2010 Harvey ................. H04L 63/102 726/18
7,818,002 B2 * 10/2010 Bajko ..................... H04L 63/08 370/331
8,051,186 B2 * 11/2011 Tian ....................... H04L 41/00 709/228

(Continued)

FOREIGN PATENT DOCUMENTS

WO    WO-2012/036992 A2    3/2012

OTHER PUBLICATIONS

International Search Report and Written Opinion for corresponding International Patent Application No. PCT/FI2012/050111 mailed May 14, 2012.

(Continued)

*Primary Examiner* — Dede Zecher
*Assistant Examiner* — Richard McCoy
(74) *Attorney, Agent, or Firm* — Harrington & Smith

(57) ABSTRACT

The exemplary embodiments include a method to perform, based on at least one of hypertext transport protocol and non-hypertext transport protocol traffic tests failing, sending an hypertext transport protocol message to a subscription remediation server URI that carries a package1 message, receiving an hypertext transport protocol response from the subscription mediation server with a package2 message, and automatically replacing a password with a new value, automatically initiating creation of a new client certificate, or launching a browser to a URI provided in the response to enable user intervention. In addition, to receive an access request from a device, determining whether credentials are valid, and if the credentials are determined valid, sending an access-accept message with a success indication, and if the credentials are determined not valid, sending an access-accept message with a success indication and an indication that access by the device is limited to only a subscription remediation server.

22 Claims, 7 Drawing Sheets

(56) References Cited

U.S. PATENT DOCUMENTS

| | | | | |
|---|---|---|---|---|
| 8,073,152 B1* | 12/2011 | Reuss | H04R 5/033 | 381/367 |
| 8,219,664 B2* | 7/2012 | Sahinoja | H04L 67/125 | 709/224 |
| 8,245,048 B2* | 8/2012 | Chai | H04L 9/3271 | 713/170 |
| 8,365,018 B2* | 1/2013 | McIntosh | H04L 12/2697 | 709/224 |
| 8,448,257 B2* | 5/2013 | Garcia Garcia | H04L 12/2697 | 709/229 |
| 8,522,315 B2* | 8/2013 | Zhang | H04L 63/08 | 370/245 |
| 2002/0144119 A1* | 10/2002 | Benantar | G06F 21/33 | 713/171 |
| 2004/0088333 A1* | 5/2004 | Sidman | G06F 21/10 | |
| 2004/0185848 A1* | 9/2004 | Phan-Anh | H04W 8/12 | 455/435.1 |
| 2004/0193920 A1* | 9/2004 | Kiss | H04L 29/06 | 726/12 |
| 2006/0230343 A1* | 10/2006 | Armandpour | G06F 11/3672 | 715/205 |
| 2007/0016658 A1* | 1/2007 | Moineau | H04L 12/4612 | 709/219 |
| 2007/0050083 A1* | 3/2007 | Signorelli | G06Q 20/20 | 700/241 |
| 2007/0093243 A1* | 4/2007 | Kapadekar | H04M 3/42178 | 455/419 |
| 2007/0199049 A1 | 8/2007 | Ziebell | | 726/3 |
| 2007/0299681 A1 | 12/2007 | Plastina et al. | | 705/1 |
| 2008/0301438 A1* | 12/2008 | Parkinson | H04L 9/3218 | 713/156 |
| 2008/0304458 A1* | 12/2008 | Aghvami | H04W 48/16 | 370/338 |
| 2009/0013210 A1* | 1/2009 | McIntosh | H04L 12/2697 | 714/4.1 |
| 2009/0144397 A1* | 6/2009 | Westman | H04L 29/06 | 709/219 |
| 2010/0116877 A1* | 5/2010 | Parmelee | G07F 19/20 | 235/379 |
| 2010/0122321 A1* | 5/2010 | Sreemanthula | H04L 63/08 | 726/3 |
| 2010/0275012 A1* | 10/2010 | Kido | H04L 63/0823 | 713/156 |
| 2011/0004615 A1* | 1/2011 | Counterman | G06F 17/30905 | 707/769 |
| 2011/0004654 A1* | 1/2011 | Tasa | H04L 41/0806 | 709/203 |
| 2012/0042237 A1* | 2/2012 | Armandpour | G06F 11/3672 | 715/234 |

OTHER PUBLICATIONS

Open Mobile Alliance, OMA device Management Protocol, Candidate Version 1.2—Jun. 2, 2006 [retrieved on May 3, 2012], OMA-TS-DM_Protocol-V1_2-20060602-C. Retrieved from the Internet: <URL: http://vallejo.cc/proyectos/envio%20sms_files/OMA-TS-DM_Protocol-V1_2-20060602-C.pdf> pp. 1-51, chapter 8.

* cited by examiner

SEAMLESS WI-FI SUBSCRIPTION REMEDIATION

CROSS-REFERENCE TO RELATED APPLICATIONS

This patent application claims priority under 35 U.S.C. §119(e) from Provisional Patent Application No.: 61/442,440, filed Feb. 14, 2011, the disclosure of which is incorporated by reference herein in its entirety.

TECHNICAL FIELD

The exemplary and non-limiting embodiments of this invention relate generally to wireless communication systems, methods, devices and computer programs and, more specifically, relate to Wi-Fi hotspot networks and the ability to perform subscription remediation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AAA authentication, authorization, and accounting
ACK acknowledgement
AP access point
CM connection manager
DM device management
DSP digital signal processor
EAP extensible authentication protocol
EAPOL EAP over LAN
HTTP hypertext transport protocol
HTTPS hypertext transport protocol secure
LAN local area network
MO managed object
OMA open mobile alliance
OMA-DM open mobile alliance device management
SOAP service oriented architectural pattern
SSID service set identifier
UD user device
URI uniform resource indicator
VLAN virtual local area network
WLAN wireless local area network
XML extensible markup language Wi-Fi is a Trademark of the Wi-Fi Alliance and is associated with various products that belong to a class of wireless local area network (WLAN) devices based on the IEEE 802.11 standards. The term Wi-Fi is often found to be used as a synonym for IEEE 802.11 technology.

Public Wi-Fi hotspot networks are widely deployed today in many environments such as hotels, restaurants, coffee shops, airports, malls and public/private offices. Internet access through these hotspot networks requires a user to either have a subscription with the operator of that hotspot network or some type of roaming arrangement.

Although an industry forum effort referred to as Hotspot 2.0 has been working to simplify the process of accessing public Wi-Fi hotspot networks, present day methods to create credentials and obtain a subscription with a Wi-Fi operator still remain cumbersome.

SUMMARY

In an exemplary aspect of the invention, there is an method comprising after making an access request to a wireless communication network, performing, with a user device, hypertext transport protocol and non-hypertext transport protocol traffic tests, based on at least one of the traffic tests failing, retrieving a uniform resource indicator of a subscription remediation server from a pre-stored management object, sending a hypertext transport protocol message to the subscription remediation server uniform resource indicator that carries a package1 message, receiving a hypertext transport protocol response from the subscription mediation server with a package2 device management message, and in response to receiving the package2 device management message, one of automatically replacing a password with a new value of the password, automatically initiating creation of a new client certificate, and launching a browser application to a uniform resource indicator provided in the response to enable user intervention.

In an exemplary aspect of the invention, there is a memory embodying computer program instructions, the computer program instructions executed by at least one processor to perform operations comprising after making an access request to a wireless communication network, performing, with a user device, hypertext transport protocol and non-hypertext transport protocol traffic tests, based on at least one of the traffic tests failing, retrieving a uniform resource indicator of a subscription remediation server from a pre-stored management object, sending a hypertext transport protocol message to the subscription remediation server uniform resource indicator that carries a package1 message, receiving a hypertext transport protocol response from the subscription mediation server with a package2 device management message, and in response to receiving the package2 device management message, one of automatically replacing a password with a new value of the password, automatically initiating creation of a new client certificate, and launching a browser application to a uniform resource indicator provided in the response to enable user intervention.

In an exemplary aspect of the invention, there is an apparatus, comprising at least one processor, and at least one memory including computer program instructions, where the at least one memory and the computer program instructions are configured, with the at least one processor, to cause the apparatus to at least: after making an access request to a wireless communication network, perform, with a user device, hypertext transport protocol and non-hypertext transport protocol traffic tests, based on at least one of the traffic tests failing, retrieve a uniform resource indicator of a subscription remediation server from a pre-stored management object, send a hypertext transport protocol message to the subscription remediation server uniform resource indicator that carries a package1 message, receive a hypertext transport protocol response from the subscription mediation server with a package2 device management message, and in response to receiving the package2 device management message, one of automatically replace a password with a new value of the password, automatically initiate creation of a new client certificate, and launch a browser application to a uniform resource indicator provided in the response to enable user intervention.

In another exemplary aspect of the invention, there is an apparatus comprising means, after making an access request to a wireless communication network, for performing, with a user device, hypertext transport protocol and non-hypertext transport protocol traffic tests, means, based on at least one of the traffic tests failing, for retrieving a uniform resource indicator of a subscription remediation server from a pre-stored management object, means for sending an hypertext transport protocol message to the subscription remediation server uniform resource indicator that carries a package1 message, means for receiving an hypertext transport protocol response from the subscription mediation server with a package2 device management message, and means, in response to receiving the package2 device management message, for one of automatically replacing a password with a new value of the password, automatically initiating creation of a new client certificate, and launching the browser application to a uniform resource indicator provided in the response to enable user intervention.

The apparatus according to the paragraph above, where the means for performing, replacing, initiating, launching, sending and receiving comprises an interface to the wireless communication network, and at least one memory including computer program instructions, the computer program instructions executable by at least one processor.

In another exemplary aspect of the invention, there is a method comprising receiving an access request from a user device in a wireless communication network, determining whether credentials of the user device are valid, and if the credentials are determined valid, sending an access-accept message with a success indication, and if the credentials are determined not valid, then sending an access-accept message with a success indication and an indication that access by the user device is limited to only a subscription remediation server.

In still another exemplary aspect of the invention, there is memory embodying computer program instructions, the computer program instructions executed by at least one processor to perform operations comprising receiving an access request from a user device in a wireless communication network, determining whether credentials of the user device are valid, and if the credentials are determined valid, sending an access-accept message with a success indication, and if the credentials are determined not valid, then sending an access-accept message with a success indication and an indication that access by the user device is limited to only a subscription remediation server.

In yet another exemplary aspect of the invention, there is an apparatus, comprising at least one processor, and at least one memory including computer program instructions, where the at least one memory and the computer program instructions are configured, with the at least one processor, to cause the apparatus to at least: receive an access request from a user device in a wireless communication network, determine whether credentials of the user device are valid, and if the credentials are determined valid, send an access-accept message with a success indication, and if the credentials are determined not valid, then send an access-accept message with a success indication and an indication that access by the user device is limited to only a subscription remediation server.

In yet another exemplary aspect of the invention, there is apparatus comprising means for receiving an access request from a user device in a wireless communication network, means for determining whether credentials of the user device are valid, and means, if the credentials are determined valid, for sending an access-accept message with a success indication, and means, if the credentials are determined not valid, for then sending an access-accept message with a success indication and an indication that access by the user device is limited to only a subscription remediation server.

The apparatus according to the paragraph above, where the means for determining, receiving and sending comprises an interface to the wireless communication network, and at least one memory including computer program instructions, the computer program instructions executable by at least one processor.

BRIEF DESCRIPTION OF THE DRAWINGS:

The foregoing and other aspects of embodiments of this invention are made more evident in the following Detailed Description, when read in conjunction with the attached Drawing Figures, wherein.

Figure 1:
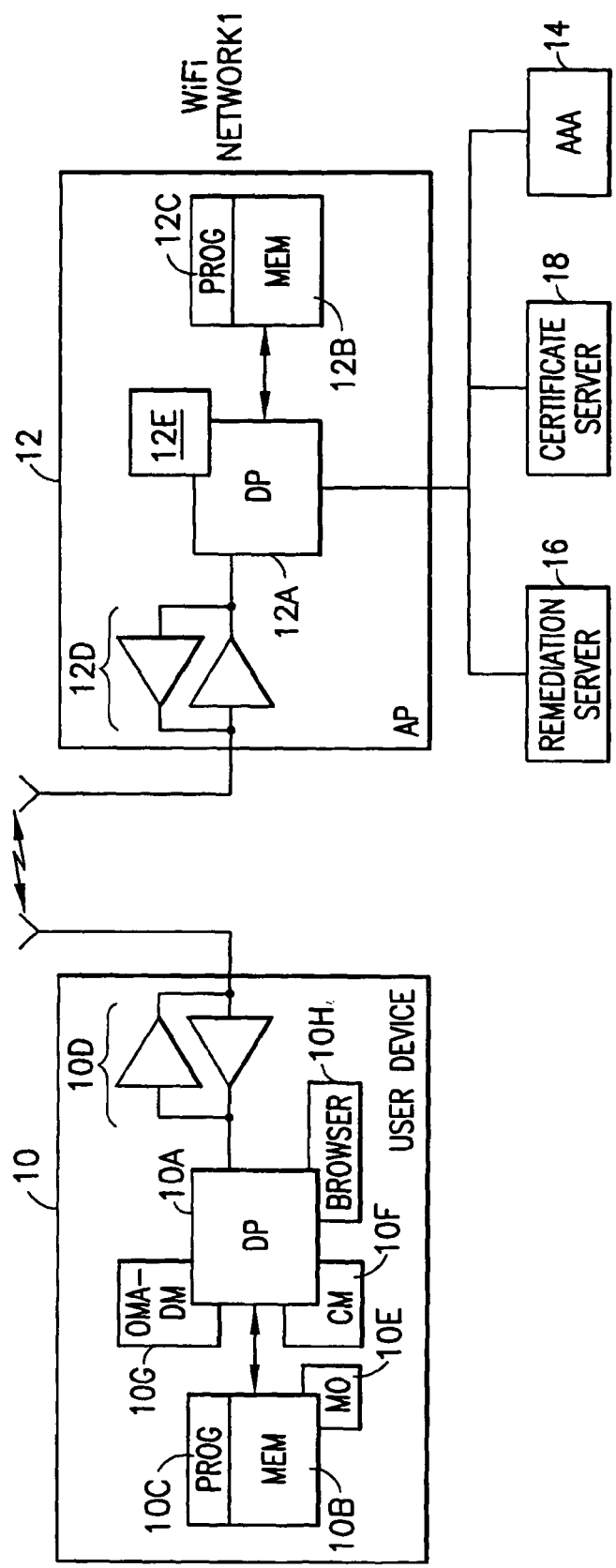
FIG. 1 shows a simplified block diagram of various electronic devices that are suitable for use in practicing the exemplary embodiments of this invention.

DETAILED DESCRIPTION:

Deployment of Wi-Fi access networks are increasing at a rapid rate. Cellular operators are also deploying their own Wi-Fi networks in dense urban areas and hotspots such as airports, hotels, sporting arenas, etc. Mobile devices such as phones, tablets, notebooks, netbooks, pads, etc., include Wi-Fi as a default. Connecting to these Wi-Fi networks requires the user to have a subscription. Access to the Internet via the Wi-Fi networks is enabled after the user has provided his/her personal information and credentials (establishes a relationship with that Wi-Fi network operator) and authenticated with the network.

Presently, as stated above, there has been an industry forum effort referred to as Hotspot 2.0 which aims to simplify the process of accessing public Wi-Fi hotspot networks. The Wi-Fi Alliance Hotspot 2.0 working group has worked to develop new mechanisms to connect to Wi-Fi access networks (without user intervention) and/or to create/remediate new subscriptions with Wi-Fi service providers for 'walk-up' customers (who do not have any prior agreement with the service provider). However, present day methods to create credentials and obtain a subscription with a Wi-Fi operator remain cumbersome.

When a subscription with a Wi-Fi operator is created, the credentials and other details such as the validity period, service set identifiers (SSIDs), policies, data limits, etc. are stored in the form of a managed object on the device. An operator may also have the ability to revoke or suspend a subscription as a result of the credential lifetime expiring or payment information becoming outdated. When a user attaches to a Wi-Fi network with which he/she already has a subscription, the authentication/authorization infrastructure may force the user to connect to a remediation server to, for example, either renew the credentials or correct payment information. This requires in all current deployments some type of user intervention. A goal of Hotspot 2.0 is to standardize a seamless way to remediate a Wi-Fi subscription.

The exemplary embodiments pertain at least in part to how to trigger connectivity from a user device to a remediation server and to update the subscription information seamlessly or with minimal user intervention. This is accomplished either automatically (no manual intervention by the user) or by the device indicating to the user that updated payment or other personal information is required to reactivate a dormant subscription.

Online signup in current Wi-Fi networks is via HTTP redirect to a portal page. Once the subscription has been created the remediation in the case of subscription expiry or issues with credentials and/or payment information is by rejecting the authentication to a network and subsequently having the user rectify the problem by sending a link to a pre-established email address, or answering questions which had been previously been established during the signup phase. These methods require user intervention. They also do not necessarily connect the user to a remediation server itself.

One prior proposal requires the definition of a new 802.11 action frame which would provide the Subscription Remediation's server URI to the STA and trigger the STA to connect to that URI. At least one problem with this proposal is that the Wi-Fi Alliance is a certification alliance and not a protocol specification standard body. That is, it is not currently possible to define such an extension to 802.11, especially when the scope of the new action frame would be so reduced (just for the purpose to remediate online sign-up created credentials).

Before describing in further detail the exemplary embodiments of this invention, reference is made to FIG. 1 for illustrating a simplified block diagram of various electronic devices and apparatus that are suitable for use in practicing the exemplary embodiments of this invention. In FIG. 1 a Wi-Fi network 1 is adapted for communication over a wireless link with an apparatus, such as a mobile communication device which may be referred to herein as a client device or a user device (UD) or simply as a device 10, via a network access node or access point (AP) 12. The AP (hotspot) 12 provides access to one or more data communications networks (e.g., the internet). The UD 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transceiver (transmitter and receiver pair) 10D for bidirectional wireless communications with the AP 12 via one or more antennas. The AP 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver (transmitter and receiver pair) 12D for communication with the UD 10 via one or more antennas. Also shown connected with the AP 12 is an AAA server 14, a subscription remediation server 16 and a certificate enrollment server 18. Servers 14, 16 and 18 can both be implemented as computer systems having data processors and memories storing computer executable code.

For the purposes of describing the exemplary embodiments of this invention the UD 10 may be assumed to also include a managed object (MO) 10E (e.g., see FIG. 3), which can be implemented as a data structure stored in the memory 10B, a connection manager module or client (CM) 10F, an open mobile alliance-device management (OMA-DM) module residing in the client 10G and the operator network, and a browser application 10H in the client that maybe used to transfer or modify this object as instructed by the network operator. While shown in FIG. 1 as separate elements, in practice the connection manager client 10F, OMA-DM client 10G and the browser application 10H can form a part of the program software 10C. In some embodiments the OMA-DM client 10G may be replaced or supplemented with a SOAP-XML client. SOAP is a protocol for exchanging XML-based messages over network, normally using HTTP. SOAP facilitates the Service-Oriented architectural pattern.

Note that the UD 10 can include a specialized WLAN integrated circuit or chip or module that embodies all or at least some of the functionality needed for WLAN connectivity and operations.

At least the PROG 10C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UD 10, or by hardware, or by a combination of software and hardware (and firmware). Elements of this invention may also reside at the AAA server 14 as discussed below. Briefly, the AAA server 14 is modified to authenticate the client device 10 even in the case where, for example, the subscription is dormant or the credit card information on file is outdated or the password is expired. The Access-Accept message in these cases would instruct the AP 12 to restrict access to the remediation server 16 by, for example, installing a policy on the AP 12 which would redirect 802.11 frames originated by that client device 10 to a specific VLAN, which is connected to the remediation server 16.

In general, the various embodiments of the user device (client device) 10 can include, but are not limited to, personal digital assistants (PDAs) having wireless communication capabilities, computers, laptops, notebooks and notepads having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, cellular telephones having Wi-Fi capability, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

In accordance with the exemplary embodiments of this invention there are provided approaches for automatic seamless subscription remediation. These are referred to herein for convenience as Method 1 and Method 2.

Method 1: Subscription Remediation Through Connectivity Verification

Figure 3:
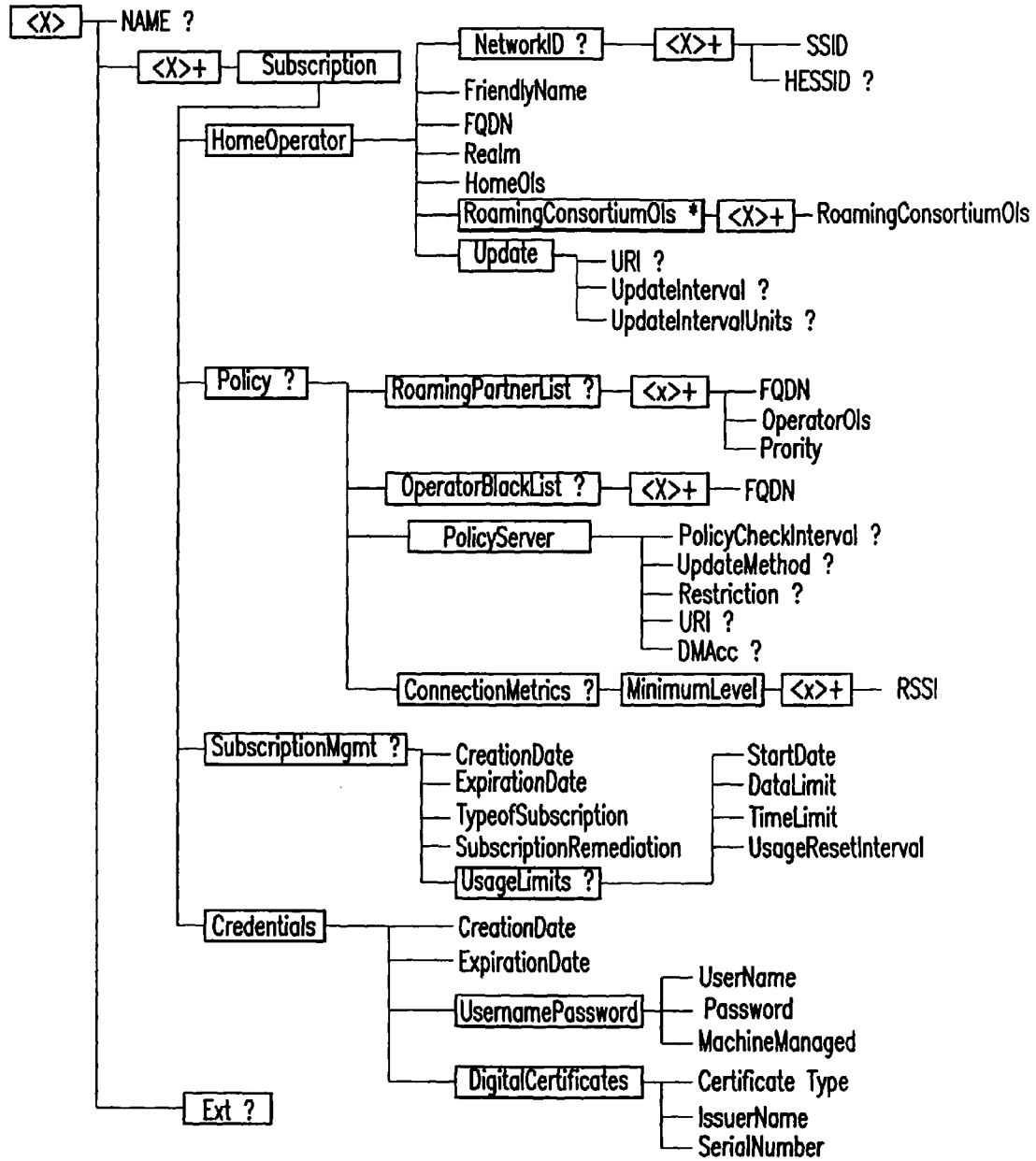
FIG. 3 is a non-limiting example of a managed object that can describe a Wi-Fi subscription and is stored in the user device shown in FIG. 1 and a subscription management server of the operator.

The user device 10, which has earlier established a subscription with a Wi-Fi operator via the Wi-Fi network 1, is configured with the managed object (MO) 10E describing the properties of the subscription. The managed object 10E includes various data such as the credentials used for authentication, the URI of the remediation server, policies related to usage and data limits, etc. A non-limiting example of a managed object is shown in FIG. 3. Note the portion under Subscription Management, which includes Subscription Remediation and creation-related data (CreationDate, ExpirationDate, TypeofSubscription, usage limits, etc.

When the user device 10 attaches to an HS2.0 Wi-Fi network, for example, with which it has a subscription it authenticates itself using the credentials which are stored in the device 10 as part of the subscription profile. If the subscription has a problem, e.g., the policy requires the password to be changed, or the credit card on file has expired, then the subscription is in need of remediation.

In accordance with the exemplary embodiments, regardless of the problem or problems with the subscription, the Wi-Fi network 1 allows the user device 10 to connect to the network with the existing credentials. When the AAA (authentication, authorization and accounting) server 14 in the network validates the credentials, it sends an Access-Accept message back to the AP 12 with a success indication, but it also instructs the AP 12 to restrict access of the device 10 only to the Remediation Server 16.

The connection manager 10F of the device 10 then performs a connectivity test to a specific address. This test could be as simple as attempting to register with a default VoIP service provider (or, alternatively, trying to set up a VPN (virtual private network) connection). In addition, the connection manager 10F attempts to send an HTTP Request to a predetermined URI. In this latter action the connection manager 10F, or the OMA-DM client 10G in the device 10, sends an HTTP Request to a well-known URI. This URI used for testing the connectivity status could be a part of the attributes of the MO 10E or it could be embedded (hardwired into) the connection manager 10F. If the registration with the chosen VoIP service provider (e.g., Skype) or the establishment of the VPN connection is successful, and in addition, the device receives an HTTP 200OK SUCCESS response to its HTTP Request, then the connectivity test can be considered successful, i.e., the device 10 has been authorized for connectivity to the Internet. Testing both HTTP and non-HTTP traffic may be required in order to overcome the configuration characteristics of some Wi-Fi Hotspots. For example, some Wi-Fi providers block all traffic except port 80 HTTP traffic. If both tests succeed it is indicated that the device 10 has been authorized for connectivity to the Internet and no (remediation or any other) action is needed. If the HTTP test succeeds, it may indicate that no remediation is necessary, but only HTTP traffic is allowed to pass. If both tests fail there is a clear indication that remediation is needed.

In accordance with an exemplary embodiment, if either of the foregoing tests fail it may be assumed that the reason for the failure is that subscription remediation is required. The AAA server 14 may have indicated in the ACCESS-Accept message to the AP 12 that the user who is attempting to obtain Internet access needs subscription remediation.. The AP 12 then allows the device 10 to only connect to the subscription remediation server 16. If the connection manager 10F or OMA-DM client 10G realizes that association and/or authentication with the AP 12 succeeded, but one or both tests described above failed, it can presume that remediation is required.

The exemplary embodiments make an assumption that when a subscription is created (before the remediation step) that the subscription MO 10E will contain the URI of the subscription remediation server 14 in a leaf node that can be referred to as, for example, SubscriptionRemediationURI. When the OMA-DM client 10G (or a SOAP-XML client) in the device 10 realizes that subscription remediation may be needed generates an HTTP message to the URI found in the SubscriptionRemediationURI. This HTTP request will carry, for example, a package1 DM message (in the case of the OMA-DM client 10G). The subscription remediation server 16 responds with, for example, a package2 DM message with one of the following possibilities:

(A) If a password needs to be updated, it can send a Replace: subscriptionMO/../password DM command to the device 10, with the new value for the password (see FIG. 2A and the description of same below);

(B) If a client certificate needs to be renewed, and that requires the client to re-enroll into a new client certificate creation, then it may send a DM Execute: ClientCertCertEnrollment command to the device 10 (which will trigger the client to begin the certificate enrollment procedure and receive a new client certificate, see FIG. 2B and the description of same below); or (C) If there is a problem with the account which requires user intervention (e.g., the credit card information needs to be updated), then the subscription remediation server 16 may send a DM command Execute:BrowsertoURI (see FIG. 2C and the description of same below). This triggers the device 10 to launch the browser application 10H and point it to the given URI, which will contain further instructions for the user. Note: that in case the device 10 uses SOAP-XML instead of OMA-DM, similar SOAP-XML objects are exchanged instead of OMA-DM objects.

In the first two possible response (A) and (B) the subscription is automatically remediated; and the device 10 will disassociate and associate with the new credentials to the network to obtain full Internet connectivity. The user of the device 10 does not need to perform any manual operations or respond to any questions. The subscription remediation may thus be considered to be seamless. For the last possibility (C) fully automatic remediation is typically not possible as in most if not all countries there are laws and regulations that require the user to enter the credit card number and agree to accept charges to that new credit card number.

Method 2:

Further in accordance with the exemplary embodiments for achieving automatic and seamless remediation, each time after successfully associating and authenticating with the Wi-Fi network, the connection manager 10F in the client device 10 checks the subscription expiry time of the subscriptionMO 10E, which was created when the user signed up for that subscription. As described above it is assumed that the network authenticates the device 10 even if the subscription has expired, but it limits access of the device 10 to only the remediation server 16. When the connection manager 10F determines that it has successfully authenticated with the network, but that the subscription has expired (as indicated in the SubscriptionExpiry leaf node of the MO 10E), it automatically launches the OMA-DM client 10G (or the SOAP- XML client) and generates an HTTP message to the URI found in the SubscriptionRemediationURI leaf node. From there on the procedures described above in Method 1 will apply That is, the subscription remediation server 16 responds with, for example, a package2 DM message with one of the following possibilities:
(A) If a password needs to be updated, it can send a Replace: subscriptionMO/../password DM command to the device 10, with the new value for the password;
(B) If a client certificate needs to be renewed, and that requires the client to re-enroll into a new client certificate creation, then it may send a DM Execute: ClientCert-CertEnrollment command to the device 10 (which will trigger the client to begin the certificate enrollment procedure and receive a new client certificate); or
(C) If there is a problem with the account which requires user intervention (e.g., the credit card information needs to be updated), then the subscription remediation server 16 may send a DM command Execute:BrowsertoURI. This triggers the device 10 to launch the browser application 10H and point it to the given URI, which will contain further instructions for the user. Note: that in case the device 10 uses SOAP-XML instead of OMA-DM, similar SOAP-XML objects are exchanged instead of OMA-DM objects.

Figure 2A:
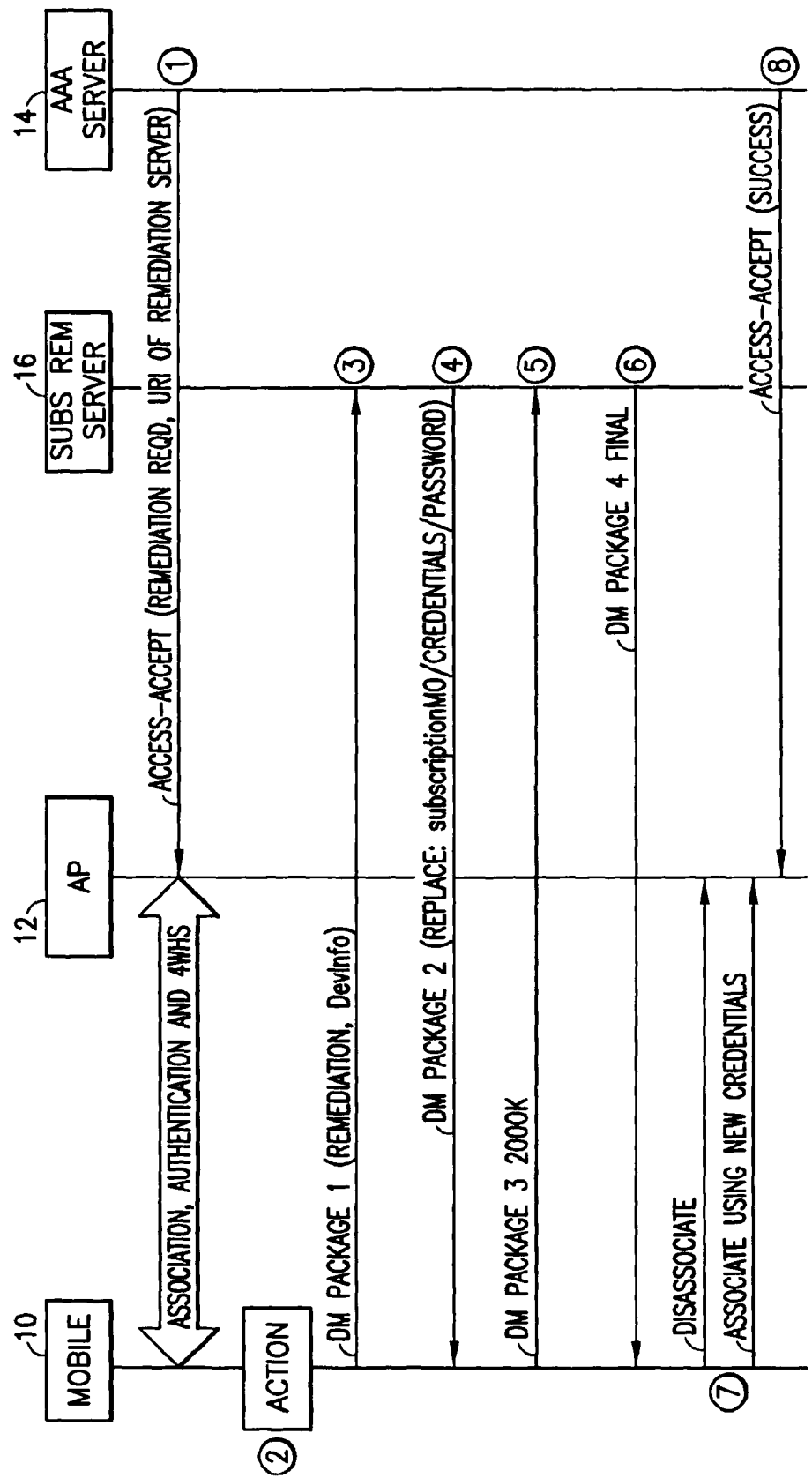
FIGS. 2A, 2B and 2C shows interaction diagrams between a station (mobile), an access point, a subscription remediation server and a AAA server in accordance with exemplary embodiments of this invention.
Figure 2B:
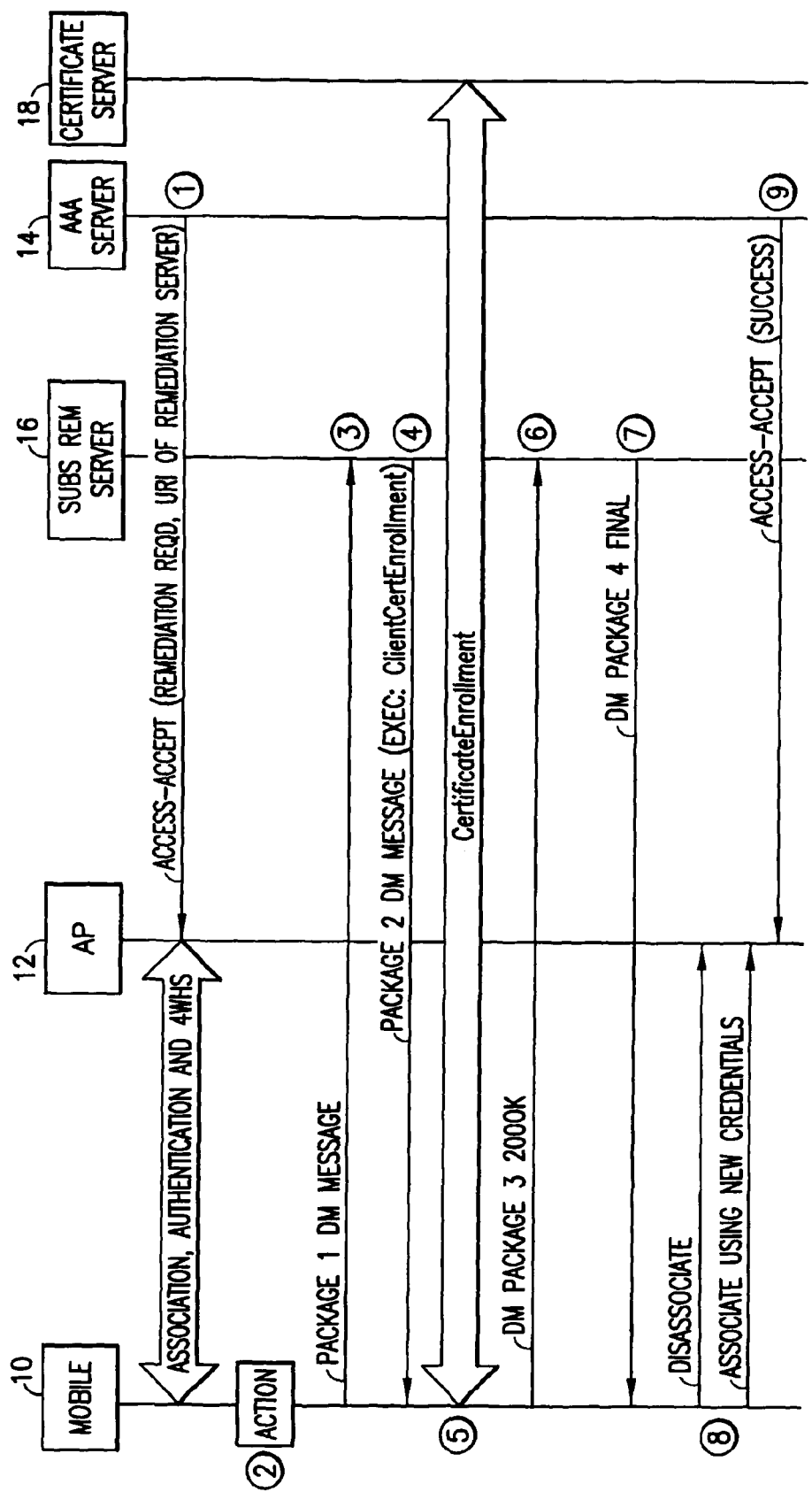
Figure 2C:
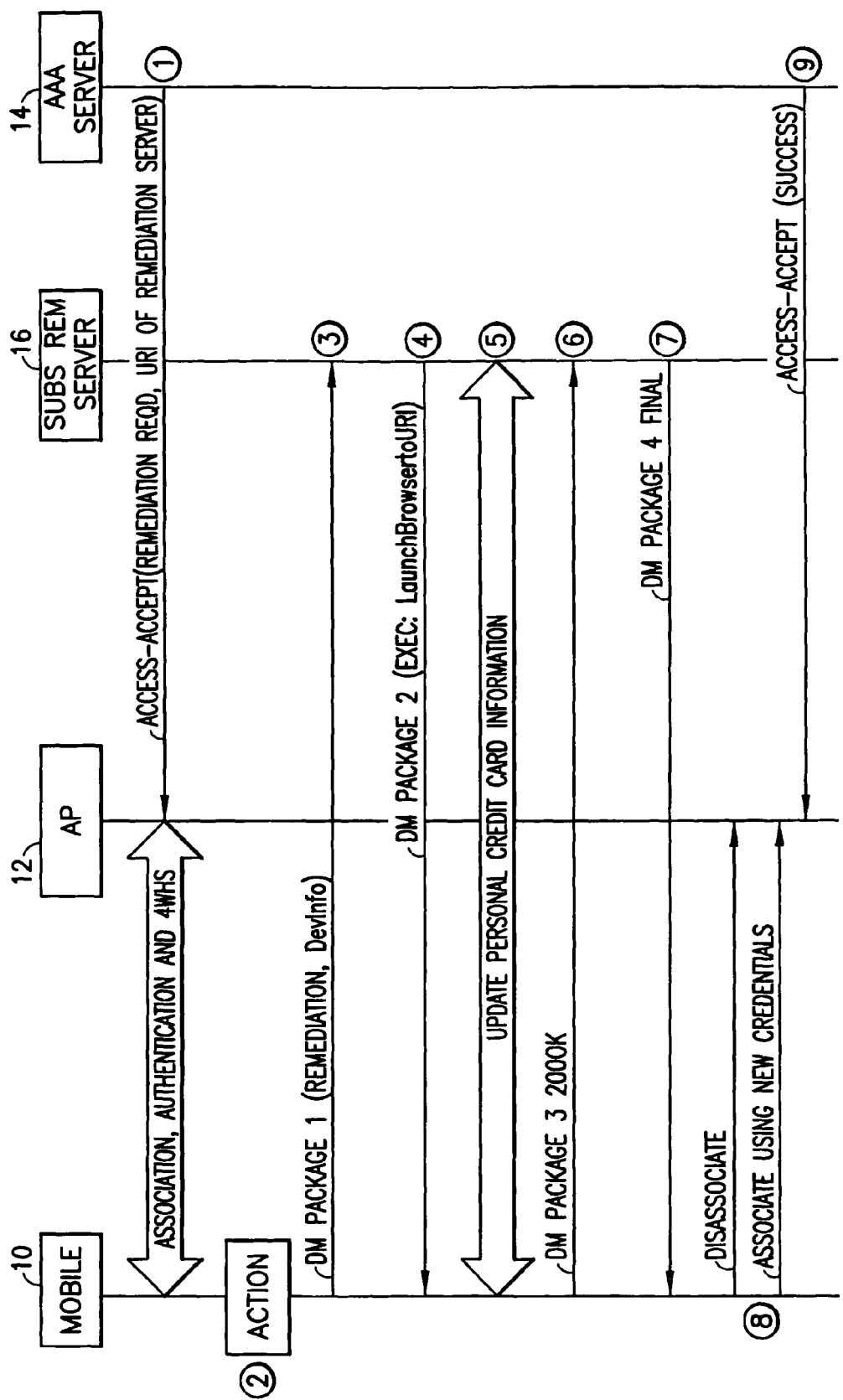

A Reference can be made to FIG. 2A, 2B and 2C. In these Figures the first interaction is between the mobile (client device 10) and the AP 12 (association, authentication and 4WHS) and between the AP 12 and the AAA server 14 (Access-Accept (remediation required, URI of remediation server). "4WHS" is an abbreviation for the four-way handshake key generation protocol of IEEE 8022.11. In each case the network successfully authenticates the client device 10 even if subscription remediation is necessary. The Access-Accept restricts access of the device 10 to the subscription remediation server 16, thus Internet connectivity would only be granted after the account is remediated.

Also in FIGS. 2A, 2B and 2C the Action (2) is test connectivity, e.g., generate a wget command to a preconfigured URI. "wget" is a Linux™ computer program that can access and retrieve a content from a web site (it is not browser based). If the response!=200OK, then launch the DM client and generate DM package 1 message with reason==remediation, or after EAPOL-SUCCESS is received, the device 10 checks the value of the ExpirationDate field in the Wi-Fi subscription. If the subscription or credentials of the subscription have expired, then the DM client is launched and generates the DM package 1 message with reason==remediation.

EAP over LAN (EAPOL), defined in the IEEE 802.1X, provides a framework for authenticating and controlling user traffic to a protected network, as well as dynamically varying encryption keys. EAPOL is a standard for passing Extensible Authentication Protocol (EAP) over a wired or wireless LAN. In a wireless environment, 802.1X also describes a way for the access point and the wireless user to share and change encryption keys, and includes messages to aid wireless operations.

In the case of FIG. 2A subsequent communication is between the client device 10 and the subscription remediation server 16 (via the AP 12): DM Package1 (Remediation, DevInfo at (3), DM Package2 (replace subsciptionMO/credentials/password at (4), DM Package3 200OK at 5, and DMPackage4 Final) at (6). This is followed by (at (7) and (8)) a disassociate, an associate using the new credentials and an Access-Accept (Success) sent from the AAA server 14.

Further in this regard it is noted that after the subscription is remediated the client device 10 should disconnect (disassociate) from the network and re-connect (re-associate) with the network in order to obtain full Internet connectivity.

FIG. 2B differs in that it includes, after the Action at (2), subsequent communications between the client device 10 and the subscription remediation server 16 and the certificate enrollment server 18 (via the AP 12): Package1 DM message at (3), Package2 DM message (Execute: ClientCertificateEnrollment) at (4), Certificate Enrollment with the certificate enrollment server 18 at (5), DM Package3 200OK at 6, and DMPackage4 Final) at (7). This is followed by (at (8 and 9)) a disassociate, an associate using the new credentials and an Access-Accept (Success) sent from the AAA server 14.

FIG. 2C differs from FIGS. 2A and 2B in that it includes, after the Action at (2), subsequent communication between the client device 10 and the subscription remediation server 16 (via the AP 12): DM Package1 (Remediation, DevInfo) at (3), DM Package2 (Execute: LaunchBrowsertoURI) at (4), user interaction via the browser 10H at (5) to update personal information/credit card information, DM Package3 200OK at 6, and DMPackage4 Final) at (7). This is followed by (at (8 and 9)) a disassociate, an associate using the new credentials and an Access-Accept (Success) sent from the AAA server 14.

The implementation of the foregoing exemplary embodiments employs changes to the connection manager client 10F and/or OMA-DM client 10G of the device 10, where the CM 10F uses information contained in the MO 10E to initiate subscription remediation. The implementation also involves changes to the AAA server 14 as was discussed above.

There are a number of advantages and technical effects that can be obtained by the use of the exemplary embodiments. For example, their use enables credentials which have expired to be renewed automatically without user intervention. This improves the user experience significantly. Further, and rather than resorting to the user receiving an email or remembering answers to certain questions the subscription remediation process is simpler and enables a subscription to be restored with a better user experience.

Based on the foregoing it should be apparent that the exemplary embodiments of this invention provide a method, apparatus and computer program(s) to enable connectivity with various types of local wireless communications types of devices and stations and terminals, such as those compliant with IEEE 802-types of communication systems, while automatically remediating user subscription issues with the service provider.

Figure 4:
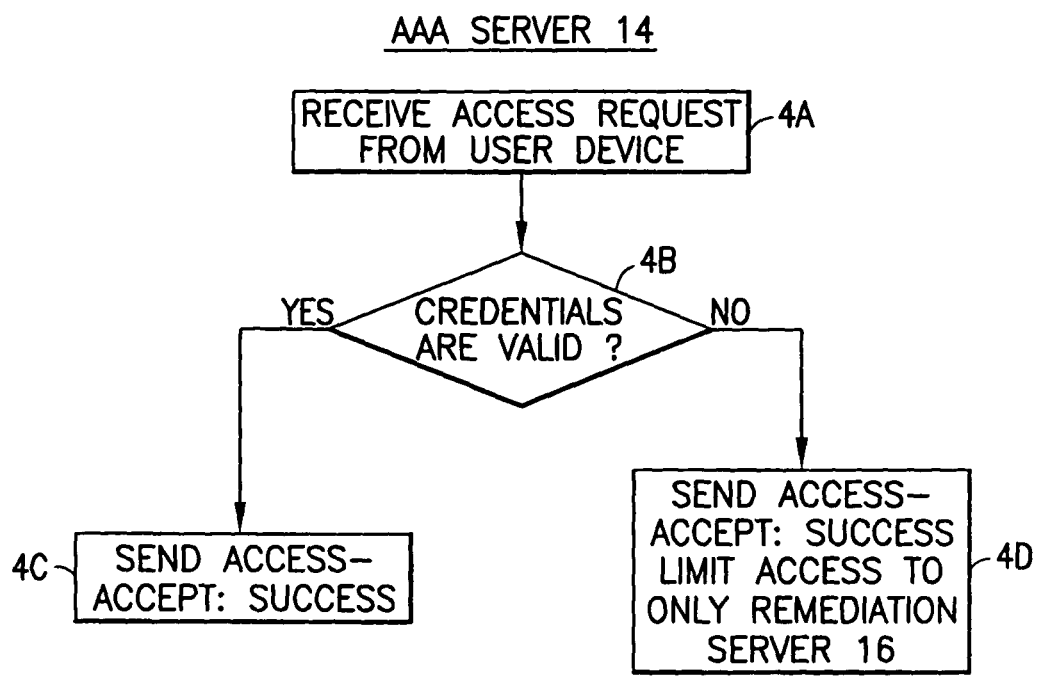
FIG. 4 is a logic flow diagram that illustrates a method, and a result of execution of computer program instructions embodied on a computer readable memory, by the AAA server of FIG. 1 in accordance with the exemplary embodiments of this invention.

FIG. 4 is a logic flow diagram that illustrates a method, and a result of execution of computer program instructions embodied on a computer readable memory, by the AAA server 14 of FIG. 1 in accordance with the exemplary embodiments of this invention. In accordance with these exemplary embodiments a method performs, at Block 4A, a step of receiving an access request from a user device. At Block 4B a determination is made if the credentials of the user device are valid. If the credentials are valid, at Block 4C an access-accept message with a success indication is sent, while if the credentials are not valid at Block 4D the access-accept message with a success indication is sent, but with an indication that the user device access is limited to only a subscription remediation server.

Further, in accordance with the method of FIG. 4, the communication network is a hot spot wireless network.

Further, in accordance with the paragraphs above, the access-accept message and the indication that the access is limited is sent to an access-point associated with the user device.

Further, in accordance with the paragraphs above, the credentials comprise at least one of credit card information and a password of the user device.

Figure 5:
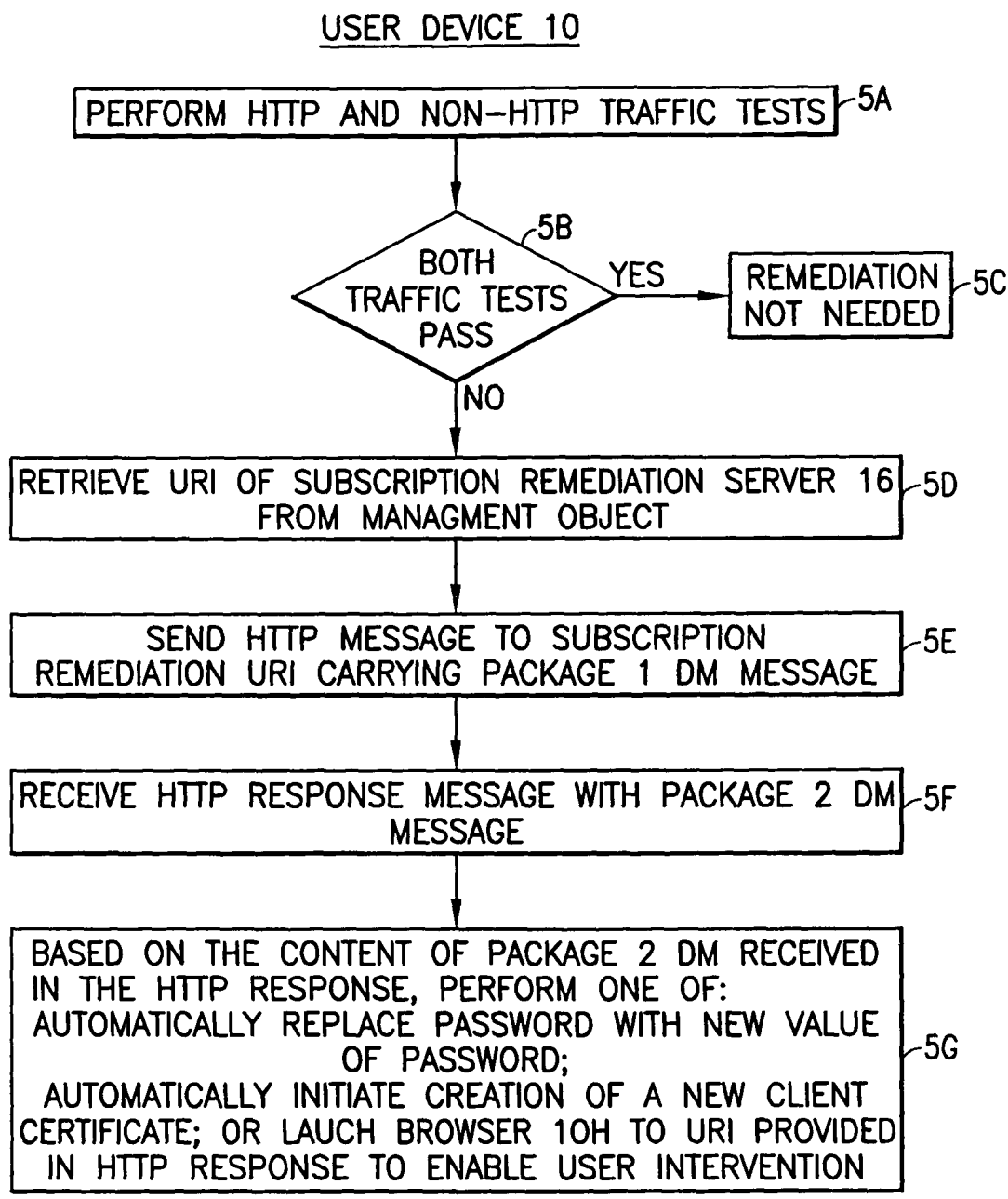
FIG. 5 is a logic flow diagram that illustrates a further method, and a result of execution of computer program instructions embodied on a computer readable memory, by the user device of FIG. 1 in accordance with the exemplary embodiments of this invention.

FIG. 5 is a logic flow diagram that illustrates a further method, and a result of execution of computer program instructions embodied on a computer readable memory, by the user device 10 of FIG. 1 in accordance with the exemplary embodiments of this invention. In accordance with these exemplary embodiments a method performs, at Block 5A, a step of, after making an access request to a Wi-Fi network, performing HTTP and non-HTTP traffic tests. At Block 5B, if both traffic tests are successful, at Block 5C it is assumed that no subscription remediation is needed. Otherwise, at Block 5C, if at least one of the traffic tests fails there is a step of retrieving a URI of a subscription remediation server from a pre-stored management object. At Block 5E there is a step of sending an HTTP message to the subscription remediation server URI that carries a package1 message. At Block 5F there is a step of receiving an HTTP response from the subscription mediation server with a package2 DM message. At Block 5G, in response to receiving the package2 DM message, there is a step of (A) automatically replacing a password with a new value of the password; (B) automatically initiating creation of a new client certificate; or (C) launching the browser application to a URI provided in the response to enable user intervention.

Further in accordance with the method of FIG. 5, and upon a successful network attachment, there is a step of checking a subscription expiry time in the pre-stored management object. If the subscription is found to have expired, there is a step of automatically generating an HTTP message to a subscription remediation server URI found in the pre-stored management object.

Further in accordance with the method of FIG. 5, and in response to the subscription being remediated, there is a step of the user device disassociating from the network and re-associating with the network in order to obtain full Internet connectivity.

In the foregoing description of FIG. 5 any references to an OMD-DM messaging scheme can be equivalently replaced with references to other signaling schemes, including SOAP-DM.

The exemplary embodiments also encompass a non-transitory computer-readable medium that contains software program instructions, where execution of the software program instructions by at least one data processor results in performance of operations that comprise execution of the method steps of FIGS. 4 and 5.

The various blocks shown in FIGS. 4 and 5 may thus be viewed as method steps, and/or as operations that result from operation of computer program code, and/or as a plurality of coupled logic circuit elements constructed to carry out the associated function(s).

The exemplary embodiments also pertain to an apparatus that comprises a processor and a memory including computer program code. The memory and computer program code are configured to, with the processor, cause the apparatus at least to receive an access request from a user device; determine if the credentials of the user device are valid and, if the credentials are valid, send an access-accept message with a success indication otherwise, if the credentials are not valid, send the access-accept message with a success indication and with an indication that the user device access is limited to only a subscription remediation server.

The exemplary embodiments also pertain to an apparatus that comprises a processor and a memory including computer program code. The memory and computer program code are configured to, with the processor, cause the apparatus at least to, after making an access request to a Wi-Fi network, perform HTTP and non-HTTP traffic tests, where if both traffic tests are successful, assume that no subscription remediation is needed, otherwise if at least one of the traffic tests fails to retrieve a URI of a subscription remediation server from a pre-stored management object, send an HTTP message to the subscription remediation server URI that carries a package1 message, receive an HTTP response from the subscription mediation server with a package2 DM message, and in response to receiving the package2 DM message, automatically replacing a password with a new value of the password; or automatically initiating creation of a new client certificate; or launching a browser application to a URI provided in the response to enable user intervention.

In general, the various exemplary embodiments maybe implemented in hardware or special purpose circuits, software, logic, chip sets, e.g., a WLAN chip set or chip sets, or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the IEEE 802 type of systems, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements maybe considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, URIs and commands are not intended to be limiting in any respect, as these parameters, URIs and commands may be identified by any suitable names. Further, the various names assigned to different network communications (e.g., HTTP) or communication techniques and clients (e.g., OMA-DM, SOAP-XML) are not intended to be limiting in any respect, as these various communications and techniques may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    authenticating, by a user device, to a wireless communication network via an access point using credentials existing in the user device;
    based on an access-accept message to the access point from the wireless communication network, authenticating the user device being to the wireless communication network using the credentials and connecting to the wireless communication network;
    based on the authenticating, performing, by the user device, a hypertext transport protocol traffic test and a non-hypertext transport protocol traffic test with the wireless communication network, and based on at least one of the traffic tests failing, determining, by the user device, that subscription remediation is required by the user device, wherein a uniform resource indicator to a subscription remediation server is identified in the access-accept message;
    sending, by the user device, to the subscription remediation server via the uniform resource indicator a first hypertext transport protocol message comprising an indication that subscription remediation is required for the user device;
    in response to the sent first hypertext transport protocol message, receiving a second hypertext transport protocol response message from the subscription remediation server, where the second hypertext transport protocol response message comprises an indication of what the subscription remediation required for the user device is due to, wherein the subscription remediation that is required is due to at least an expiration of a password of the user device;
    and based on the second hypertext transport protocol response message, performing the subscription remediation with the subscription remediation server comprising automatically replacing at least the password with a new value of the password, and automatically initiating creation of a new client certificate using the new value of the password.

2. The method according to claim 1, where if both the hypertext transport protocol traffic test and the non-hypertext transport protocol traffic test are successful no subscription remediation is needed.

3. The method according to claim 1, where the subscription remediation that is required is further due to a subscription expiry time for the user device indicating an expiration of the subscription.

4. The method according to claim 1, where the automatically replacing at least the password with a new value of the password, and automatically initiating creation of a new client certificate using the new value of the password is performed in a management object existing on the user device.

5. The method according to claim 1, in response to a subscription of the user device being remediated, disassociating the user device from the network and re-associating the user device with the network in order to obtain full internet connectivity.

6. The method according to claim 1, where at least one of the first hypertext transport protocol response message and the second hypertext transport protocol response message comprises a DevInfo device management message.

7. A non-transitory memory embodying computer program instructions, the computer program instructions executed by at least one processor to perform the method according to claim 1.

8. An apparatus comprising:
    at least one processor; and
    at least one memory including computer program instructions, where the at least one memory and the computer program instructions are configured, with the at least one processor, to cause the apparatus to at least:
    authenticating with a user device to a wireless communication network via an access point using credentials existing in the user device;
    based on an access-accept message to the access point from the wireless communication network; authenticating the user device to wireless communication network using the credentials and connecting to the wireless communication network;
    based on the authenticating, perform, with the user device, a hypertext transport protocol traffic test and a non-hypertext transport protocol traffic test with the wireless communication network, and based on at least one of the traffic tests failing, determine with the user device that subscription remediation is required by the user device, wherein a uniform resource indicator to a subscription remediation server is identified in the access-accept message;
    send the subscription remediation server via the uniform resource indicator a first hypertext transport protocol message comprising an indication that subscription remediation is required for the user device;
    in response to the sent first hypertext transport protocol message, receive a second hypertext transport protocol response message from the subscription remediation, where the second hypertext transport protocol response message comprises an indication of what the required subscription remediation required for the user device is due to, wherein the subscription remediation that is required is due to at least an expiration of a password of the user device; and
    based on the second hypertext transport protocol response, performing the subscription remediation with the subscription remediation server comprising automatically replacing at least the password with a new value of the password, and automatically initiating creation of a new client certificate using the new value of the password.

9. The apparatus according to claim 8, where if both the hypertext transport protocol traffic test and the non-hypertext transport protocol traffic test are successful no subscription remediation is needed.

10. The apparatus according to claim 8, where the subscription remediation that is required is further due to a subscription expiry time for the user device indicating an expiration of the subscription.

11. The apparatus according to claim 8, where the automatically replacing at least the password with a new value of the password, and automatically initiating creation of a new client certificate using the new value of the password is performed in a managed object on the user device.

12. The apparatus according to claim 8, where in response to the subscription being remediated, the computer program instructions are configured, with the at least one processor, to cause the apparatus to disassociate the user device from the network and re-associate the user device with the network in order to obtain full internet connectivity.

13. The apparatus according to claim 8, where at least one of the first hypertext transport protocol response message and the second hypertext transport protocol response message comprises a DevInfo device management message.

14. A method comprising:
    receiving via an access point of a wireless communication network a hypertext transport protocol message from a user device that is connected to the wireless communication network, where the receiving is after the user device is allowed to authenticate to the wireless communication network using credentials and after the user device performs, based on the authenticating, a hypertext transport protocol traffic test and a non-hypertext transport protocol traffic test with the wireless communication network;
    determining whether the credentials of the user device are valid; and
    if the credentials are determined valid, sending an access-accept message authenticating the user device, and
    if the credentials are determined not valid, then sending via the access point to the user device an access-accept message authenticating the user device, where the access-accept message is instructing the access point to restrict access by the user device-to only a subscription remediation server of the wireless communication network, and indicating that, based on at least one of the traffic tests failing, a remediation of the credentials is required for the user device.

15. The method according to claim 14, wherein the communication network is a hot spot wireless network.

16. The method according to claim 14, wherein the credentials comprise at least one of credit card information and a password of the user device.

17. A non-transitory memory embodying computer program instructions, the computer program instructions executed by at least one processor to perform the method according to claim 14.

18. An apparatus, comprising:
    at least one processor; and
    at least one memory including computer program instructions, where the at least one memory and the computer program instructions are configured, with the at least one processor, to cause the apparatus to at least:
    receive via an access point of a wireless communication network a hypertext transport protocol message from a user device that is connected to the wireless communication network, where the receiving is after the user device is allowed to authenticate to the wireless communication network using credentials and after the user device performs, based on the authenticating, a hypertext transport protocol traffic test and a non-hypertext transport protocol traffic test with the wireless communication network;
    determine whether the credentials of the user device are valid; and
    if the credentials are determined valid, send an access-accept message authenticating the user device, and
    if the credentials are determined not valid, then send an access-accept message authenticating the user device, where the access-accept message is instructing the access point to restrict access by the user device to only a subscription remediation server of the wireless communication network, and indicating that, based on at least one of the traffic tests failing, remediation of the credentials is required for the user device.

19. The apparatus according to claim 18, where the access-accept message is sent to the access-point associated with the user device.

20. The apparatus according to claim 18, wherein the credentials comprise at least one of credit card information and a password of the user device.

21. The method according to claim 1, where the access-accept message comprises a uniform resource indicator to enable user intervention at the user device for the remediation.

22. The method according to claim 1, where the at least one of a hypertext transport protocol traffic test and a non-hypertext transport protocol traffic test comprises at least one connectivity test to a predetermined address.

\* \* \* \* \*